(12) United States Patent
Kurita et al.

(10) Patent No.: US 9,276,369 B2
(45) Date of Patent: Mar. 1, 2016

(54) METHOD OF ASSEMBLING AN ELECTRIC EQUIPMENT HAVING A FIRST CONNECTOR AND A SECOND CONNECTOR

(71) Applicant: Kabushiki Kaisha Toshiba, Tokyo (JP)

(72) Inventors: Hirofumi Kurita, Aichi-ken (JP); Noriyasu Kashima, Aichi-ken (JP); Tomohiro Shimamoto, Mie-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 229 days.

(21) Appl. No.: 13/772,107

(22) Filed: Feb. 20, 2013

(65) Prior Publication Data
US 2013/0219696 A1    Aug. 29, 2013

(30) Foreign Application Priority Data

Feb. 24, 2012  (JP) .................................. 201238672

(51) Int. Cl.
*G01R 31/28* (2006.01)
*H01R 43/26* (2006.01)
*H04N 7/18* (2006.01)
*H01R 13/627* (2006.01)

(52) U.S. Cl.
CPC ................ *H01R 43/26* (2013.01); *H04N 7/18* (2013.01); *H01R 13/6272* (2013.01); *Y10T 29/49004* (2015.01)

(58) Field of Classification Search
CPC ............. Y10T 29/49004; H01L 2924/01079; H05K 13/08; G01N 21/88; G01R 31/309; B07C 5/344; G01B 11/24
USPC .............. 29/593; 250/559.34; 348/125, 126; 209/571, 573; 356/625
See application file for complete search history.

(56) References Cited

U.S. PATENT DOCUMENTS

| 4,925,309 A | | 5/1990 | Endo et al. |
| 5,347,362 A | * | 9/1994 | Sugawara ..................... 356/625 |
| 5,576,828 A | * | 11/1996 | Tomiyama et al. ........... 356/625 |

(Continued)

FOREIGN PATENT DOCUMENTS

| JP | 2008-177096 A | 7/2008 |
| JP | 2010113907 | 5/2010 |

OTHER PUBLICATIONS

Office Action issued in related Mexican Patent Applicatin No. MX/a/2013/002133 mailed Mar. 25, 2014, 6 pages (with translation).

(Continued)

*Primary Examiner* — Paul D Kim
(74) *Attorney, Agent, or Firm* — Baker Botts L.L.P.

(57) ABSTRACT

According to one embodiment, one of two connectors, and a circuit board on which the other of the connectors is mounted are prepared. The one of the connectors has an engagement portion. The other of the connectors has an elastically deformable engagement detent. The engagement detent can go over the engagement portion and be engaged with the engagement portion. One of the connectors is fitted to the other of the connectors. A portion of the electric equipment is imaged by a camera. A piece of data which changes is measured from an obtained picture image. A deformation of the engagement detent occurs with going-up of the engagement detent onto the engagement portion. Whether or not the connectors are properly fitted is determined. Fitting of the connectors is performed again when it is determined that the connectors are not properly fitted.

5 Claims, 10 Drawing Sheets

(56) References Cited

U.S. PATENT DOCUMENTS

| | | | | |
|---|---|---|---|---|
| 5,583,641 | A * | 12/1996 | Tomiyama et al. | 356/625 |
| 5,659,491 | A * | 8/1997 | Ichikawa et al. | 702/65 |
| 5,772,040 | A * | 6/1998 | Tomiyama et al. | 209/3.3 |
| 6,887,204 | B2 * | 5/2005 | Nozaki et al. | 600/459 |
| 7,145,162 | B2 * | 12/2006 | Cheng et al. | 250/559.34 |
| 8,466,802 | B2 * | 6/2013 | Stollberg | 340/687 |

OTHER PUBLICATIONS

Office Action issued in related Mexican Patent Application No. MX/a/2013/002133 mailed Dec. 5, 2014, 6 pages (with translation).
Office Action issued in related Mexican Patent Application No. MX/a/2013/002133 mailed Apr. 7, 2015, 3 pages (with translation.).
Office Action issued in related Chinese Patent Application No. 201310052991.3 mailed Feb. 2, 2015, 46 pages (with translation.).

* cited by examiner

METHOD OF ASSEMBLING AN ELECTRIC EQUIPMENT HAVING A FIRST CONNECTOR AND A SECOND CONNECTOR

CROSS-REFERENCE TO RELATED APPLICATION

This application is based upon and claims the benefit of priority from the prior Japanese Patent Application No. 2012-38672, filed on Feb. 24, 2012, the entire contents of which are incorporated herein by reference.

FIELD

Embodiments described herein relate generally to a method of assembling an electric equipment having connectors, to an inspection device for inspecting a fitted state of connectors, and to an inspection method of inspecting a fitted state of connectors.

BACKGROUND

Connectors are used for connecting electric wirings or optical interconnections. These wirings are connected by fitting a pair of two connectors. In an assembly process for mass-production, for example, a plurality of wiring connections are performed. Incomplete fitting of connectors even at one place results in deterioration of quality of a product as well as becomes a cause of an assembly defect. Thus, it is desired to perform fitting operation of connectors precisely and to ensure quality. However, the fitting operation of the connectors is performed by a human work so that a mistake can occurs inevitably.

In Japanese Patent Application Publication No. 2010-113907, for example, an inspection method is disclosed. According to the inspection method, whether or not two connectors are properly fitted is inspected. The connectors are a male connector and a female connector respectively. Engagement portions i.e. locking protrusions are provided on a fitting concave portion of the male connector. Engagement detents i.e. locking arms that are deformable elastically are provided on the female connector. The engagement detents are deformed elastically and go over the engagement portions so as to engage with the engagement portions. Through the engagement, the two connectors become in a properly fitted state. In order to perform the inspection, a holding member and a jig are employed. The holding member holds a male connector. The jig inserts a female connector into the fitting concave portion of the male connector. An optical sensor is provided at the jig. Further, a reference member having a mark is provided movably. The female connector is inserted into the fitting concave portion of the male connector. The mark is detected from a change in the amount of a received light by an optical sensor so that whether or not the two connectors are properly fitted is inspected.

According to the above-described method, whether or not the two connectors are properly fitted is determined by detecting the position of the mark. The dimensions of a plurality of places of the connectors in the fitting direction are involved in setting of the position of the mark. In particular, in order that the above-described engagement portion is engaged with the engagement detent, an allowance dimension is inevitably needed in the fitting direction of the connector.

Recent years, miniaturization of connectors has progressed, and such an allowance dimension becomes smaller as the sizes of connectors become smaller. Further, since dimension tolerances of connectors are also involved in setting of a position of a mark as well as the allowance dimension, setting a position of a mark becomes difficult. As a result, it is difficult to ensure inspection accuracy of a fitted state of the connectors.

DETAILED DESCRIPTION

Figure 1A:
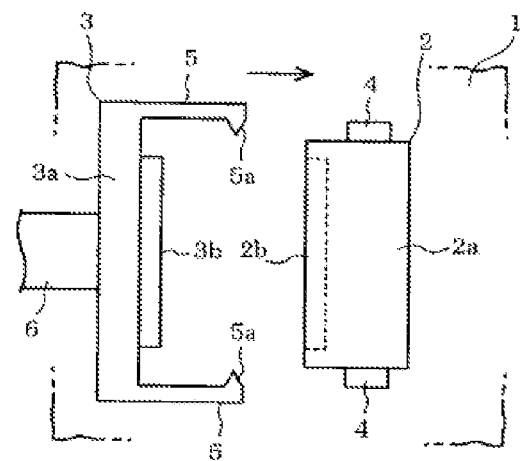
FIG. 1A to 1C show steps of assembling an electric equipment having a first connector and a second connector according to a first embodiment, and are plan views schematically showing steps of fitting the first connector and the second connector, respectively.

One embodiment provides a method of assembling an electric equipment having a first connector and a second connector which is made by fitting one of the first connector and the second connector to the other of the first connector and the second connector.

One of a first connector and a second connector, and a circuit board on which the other of the first connector and the second connector is mounted are prepared. The first connector has an engagement portion. The second connector has an elastically deformable engagement detent for engaging with the engagement portion. The engagement detent is capable of going over the engagement portion and being engaged with the engagement portion through fitting. One of the first connector and the second connector is fitted to the other of the first connector and the second connector. A portion including the engagement detent of the electric equipment is imaged by a camera. A piece of data which changes with deformation of the engagement detent is measured from a picture image obtained by the imaging. The deformation occurs with going-up of the engagement detent onto the engagement portion. Whether or not the first connector and the second connector are properly fitted is determined by comparing the measured piece of data and a piece of predetermined reference data. Fitting of the first connector and the second connector is performed again when it is determined that the first connector and the second connector are not properly fitted as a result of the determination.

Hereinafter, further embodiments will be described with reference to the drawings. In the drawings, the same reference numerals denote the same or similar portions respectively.

A first embodiment will be described with reference to FIG. 1A to 1C and FIGS. 2 to 6. The first embodiment relates to an inspection method, an inspection device and a method of assembling an electric equipment having connectors.

Figure 1B:
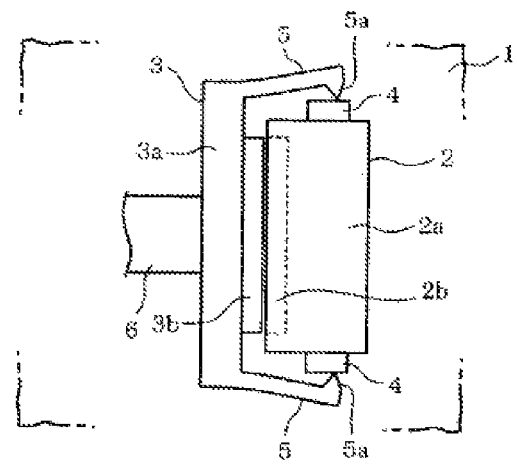
Figure 1C:
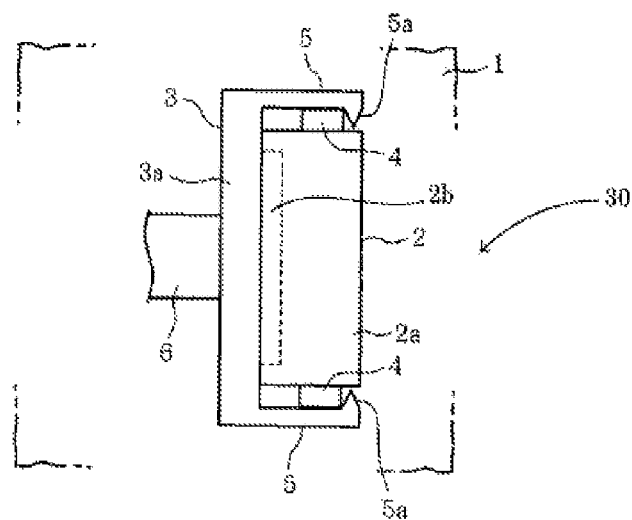

FIGS. 1A to 1C show a method of assembling an electric equipment having connectors according to a first embodiment. FIGS. 1A to 1C are plan views schematically showing an aspect of fitting a second connector 3 to a first connector 2 mounted on a circuit board 1. FIG. 1A shows a state before fitting, FIG. 1B shows a state during fitting, and FIG. 1C shows a state after fitting. The circuit board 1 is a printed wiring board, and is arranged in a state in which an upper surface of the circuit board 1 is parallel to a plane of the paper showing FIGS. 1A to 1C. The first connector 2 is a female connector, and is mounted on the upper surface of the circuit board 1. The first connector 2 has a connector main body 2a of plastic.

The first connector 2 has engagement portions 4 which are composed of convex portions projecting outside at both opposing side portions (both top and bottom side portions in FIGS. 1A to 1C) of the connector main body 2a. The first connector 2 has a plurality of conductive connection terminals on a side of an end portion on a left end portion in FIGS. 1A to 1C. The connection terminals 3b are shown as one component as a whole in FIGS. 1A to 1C. The connection terminals are female terminals, and are arranged in parallel with each other in an up-and-down direction. The connection terminals 3b are connected electrically to terminals of the circuit board 1 via wirings (not shown).

The second connector 3 is a male connector which forms a pair with the first connector 2, and has engagement detents 5. The engagement detents 5 projects toward a right side in FIGS. 1A to 1C respectively at both opposing side portions i.e. both top and bottom side portions in FIGS. 1A to 1C of a connector main body 3a made of plastic which composes the second connector 3. The second connector 3 has a plurality of conductive connection terminals 3b projecting toward the right side in FIGS. 1A to 1C. The connection terminals 3b are shown as one component as a whole in FIGS. 1A to 1C. The connection terminals 3b are male terminals, and are arranged in parallel with each other in an up-and-down direction. Each of the two engagement detents 5 is elastically deformable by making a base end portion of each engagement detent on a side of the connector main body 3a serve as a fulcrum point. Each engagement detent 5 has an engaging convex portion 5a integrally on the inside of a tip portion on a free end portion side. The engaging convex portion 5a has a triangular cross section. The two engagement detents 5 face to each other, and the second connector 3 is formed in a U-character shape in a planar view. A plurality of electric wires (a wire harness) 6 are connected to the connector main body 3a of the second connector 3. The electric wires 6 are shown as one component as a whole in FIGS. 1A to 1C. The electric wires 6 are connected to the connection terminals 3b electrically. The electric wires 6 are led out in a direction (leftward in FIG. 1A) opposite to the engagement detents 5.

Fitting of the first connector 2 and the second connector 3 is performed as described below. As shown in FIG. 1A, in the state in which the engagement detents 5 of the second connector 3 are directed toward the a side of the first connector 2, the second connector 3 is moved toward the side of the first connector 2 (in a direction indicated by an arrow) so as to engage the two engagement detents 5 of the second connector 3 with the engagement portions 4 of the first connector 2. At this time, as shown in FIG. 1B, the two opposing engagement detents 5 of the second connector 3 accompany elastic deformation respectively, the engaging convex portions 5a go up onto the corresponding engagement portions 4 of the first connector 2, then go over the engagement portions 4, and become in a state of engaging with the engagement portions 4 in a retaining state, as shown in FIG. 1C. Through such actions, the connection terminals of the first connector 2 and the connection terminals 3b of the second connector 3 are fitted so as to make a product 30 i.e. a work, and the first connector 2 and the second connector 3 become in a properly fitted state. The fitting operation of the first connector 2 and the second connector 3 is performed by an operator i.e. a person.

An inspection method and an inspection device for determining whether or not the first connector 2 and the second connector 3 are properly fitted will be described. According to the inspection method and the inspection device, inspection is performed using a change in a dimension of the engagement detents 5 of the second connector 3 which changes depending on a fitting state.

Figure 2:
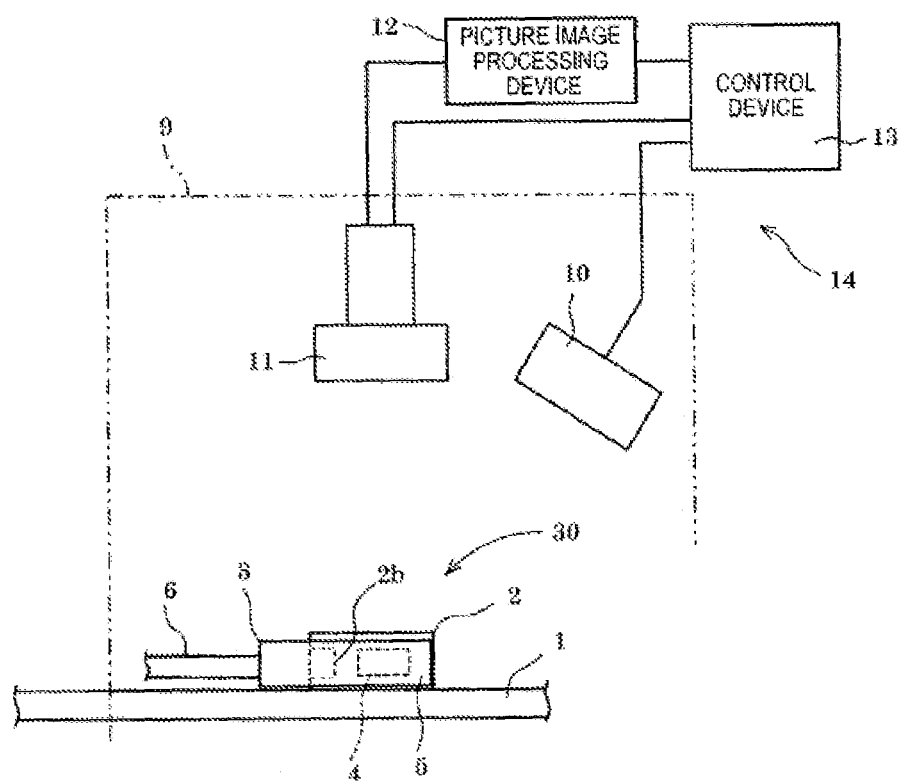
FIG. 2 is a side view schematically showing an aspect where a fitting state of the first connector and the second connector is inspected.

FIG. 2 is a side view schematically showing an aspect where a fitting state of the first connector 2 and the second connector 3 is inspected. In an inspection area 9, a light 10 composing an illumination unit and a camera 11 for imaging a fitting state of the connectors are installed. The light 10 and the camera 11 are set at a position and with an angle which are suitable for imaging the fitted state of connectors. The position and the angle of the camera 11 are controllable. The light 10 is installed at the position to illuminate the first and second connectors 2, 3 kept in a fitted state from obliquely upward direction. The camera 11 is installed at a position where the first and second connectors 2, 3 set in a fitted state can be imaged from directly above approximately so that at least the two engagement detents 5 of the second connector 3 are included. An image processing device 12 is connected to the camera 11. The light 10, the camera 11, the image processing device 12 are controlled by a controller 13. The controller 13 is mainly composed of a micro computer, for example. The light 10, the camera 11, the image processing device 12 and the controller 13 compose an inspection device 14.

Figure 3:
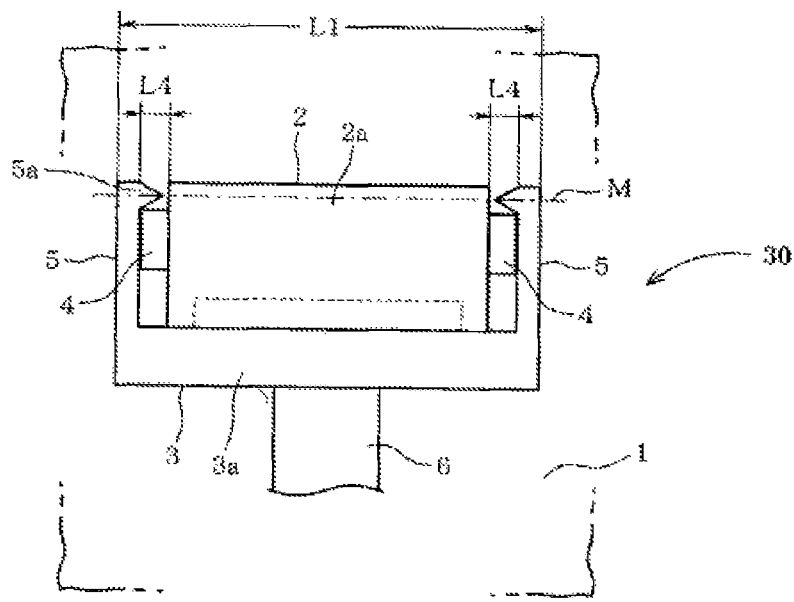
FIG. 3 is a view schematically showing a picture image of the first connector and the second connector which are in a properly fitted state.
Figure 4:
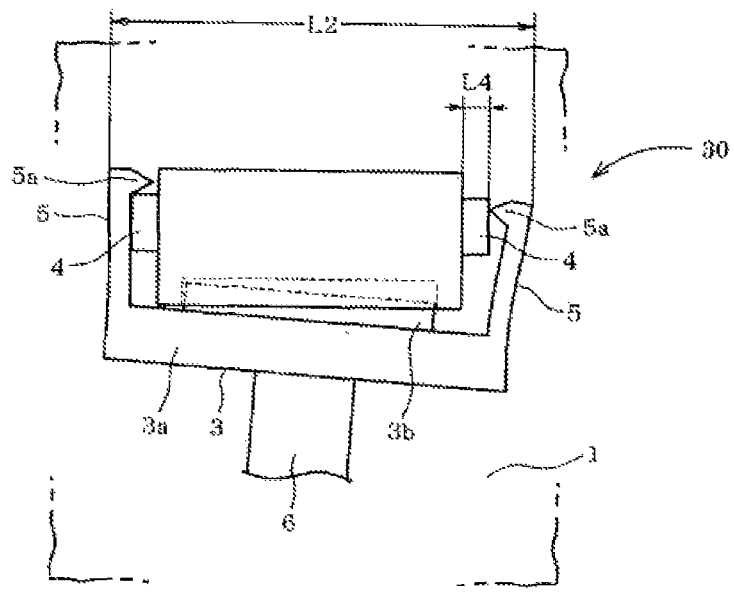
FIG. 4 is a view schematically showing a picture image of the first connector and the second connector which are in an improperly fitted state.
Figure 5:
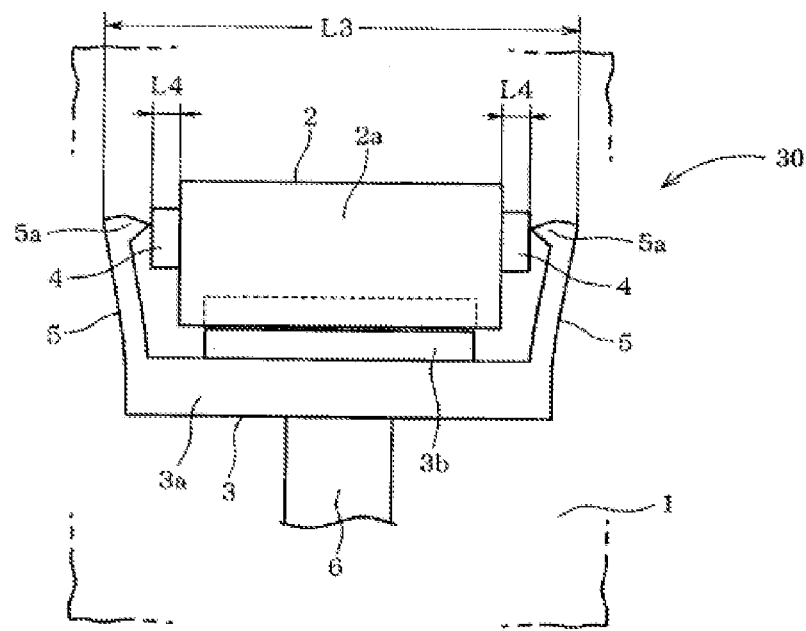
FIG. 5 is a view schematically showing a picture image of the first connector and the second connector which are in an improperly fitted state.

In FIGS. 3 to 5, different picture images which are imaged by the camera 11 are shown schematically. FIG. 3 is a picture image of the first connector 2 and the second connector 3 kept in a properly fitted state. The properly fitted state is a state in which the engaging convex portions 5a of the engagement detents 5 of the second connector 3 go over the respective engagement portions 4 projecting by a dimension L4 toward the inside of the first connector 2 and are properly engaged with the engagement portions 4. The engagement detents 5 return to a state before fitting from a deformed state by going over the corresponding engagement portions 4.

A length dimension L1 between the opposing engagement detents 5, 5 is measured from the picture image of FIG. 3 by the image processing device 12. In order to perform the measurement, pattern matching between a piece of pattern data of a connector shape which is previously registered in the image processing device 12 and the picture image of FIG. 3 is performed. The position and the angle of the camera 11 are adjusted until the picture image matches with the registered piece of pattern data. Through the pattern matching, a place to be measured i.e. a line "M" on the product 30 shown in FIG. 3 is determined. Further, pattern edges (boundaries of the engagement detents 5 and the circuit board 1 as a background) of the respective engagement detents 5 of the second connector 3 are detected. The length dimension ranging from one to the other of the engagement detents 5 i.e. the opening dimension between the two engagement detents is measured to obtain a dimension L1. The dimension L1 is the same as the dimension in a state before the second connector 3 is fitted in the first connector 2.

FIG. 4 is a picture image in a state in which the fitting operation of the connectors is not properly performed. The engaging convex portion 5a of one of the two engagement detent 5 goes over one of the engagement portions 4 provided in the first connector 2 and is engaged. But the engaging convex portion 5a of the other of the engagement detents 5 goes up onto the other of the engagement portions 4. The other of the engagement detents 5 keeps deforming toward outside. In the same manner as in the case of FIG. 3, a length dimension between the engagement detents 5 in the picture image of FIG. 4 i.e. the opening length dimension of the engagement detents 5 is measured so as to obtain a dimension L2. In this case, the length dimension L2 can be expressed by the following expression.

$$L2 \approx L1 + L4 \quad (1)$$

FIG. 5 is a picture image in the state in which the fitting operation of the connectors is not also properly performed. The engaging convex portions 5a of the two engagement detents 5 of the second connector 3 go up onto the corresponding engagement portions 4, and the engagement detents 5 become in a state in which the engagement detents 5 are deformed outside. In the same manner as in the case of FIG. 3, the length dimension between the engagement detents 5 in the picture image of FIG. 5 i.e. the opening length dimension of the two engagement detents is measured so as to obtain a dimension L3. In this case, L3 can be expressed by the following expression.

$$L3 \approx L1 + 2L4 \quad (2)$$

The dimensions L1, L2 and L3 obtained from the picture images of FIG. 3, FIG. 4 and FIG. 5 become in the relation of the following expression.

$$L1 < L2 < L3 \quad (3)$$

Then, a threshold value X1 i.e. a piece of reference data is set in order to determine a first connector 2 and a second connector 3 kept in a properly fitted state as acceptable, and to determine those kept in an improperly fitted state as rejectable. The threshold value X1 is set so as to satisfy the following expression.

$$L1 < X1 < L2 < L3 \quad (4)$$

Specifically, the threshold value X1 is set by the following expression. The threshold value X1 is stored in the controller 13 as the piece of reference data.

$$X1 = (L1 + L2)/2 \quad (5)$$

Figure 6:
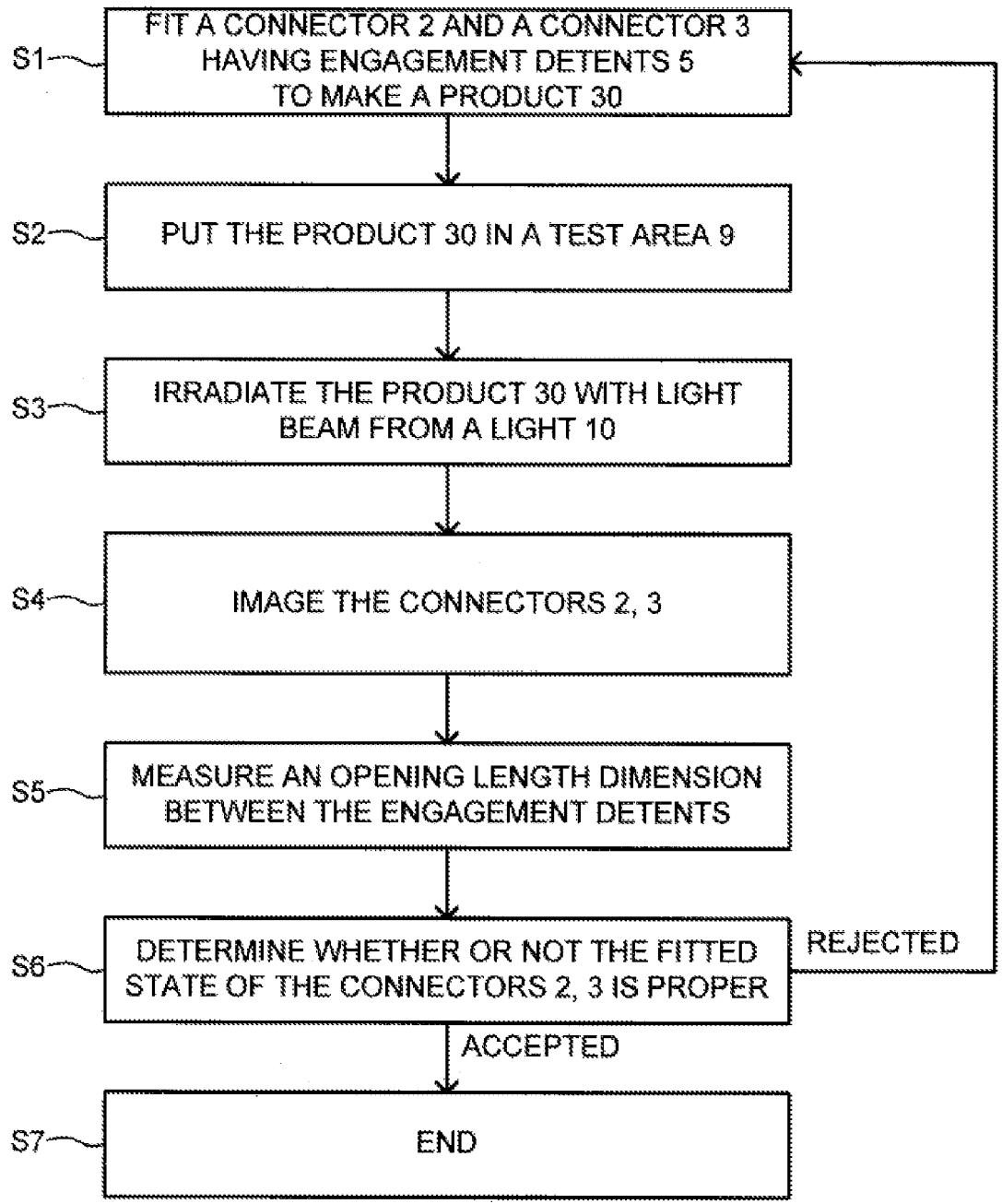
FIG. 6 is a flow chart to explain steps of an inspection method according to the first embodiment.

With reference to FIG. 6, the process from the fitting operation of the connectors as described above to the end of the inspection will be described. An operator performs fitting operation of the first connector 2 mounted on the circuit board 1 and the second connector 3 (step S1). The operator puts a product 30 i.e. a work in which the first connector 2 and the second connector 3 are fitted into the inspection area 9 (step S2). Then, the controller 13 makes the light 10 light up to illuminate the first connector 2 and the second connector 3 kept in a fitted state from an upward direction (step S3). The controller 13 controls the camera 11 to image the first connector 2 and the second connector 3 kept in the fitted state from the upward direction (step S4).

The controller 13 instructs the image processing device 12 to perform processing of a picture image which is imaged by the camera 11. The controller 13 measures an opening length dimension L between the two engagement detents 5 of the second connector 3 (step S5). The controller 13 further compares the measured data L obtained by the measurement and the threshold value X1 i.e. the piece of reference data. The controller 13 determines whether or not the fitting state is proper (step S6). Specifically, the controller 13 determines the product 30 as acceptable if the measured data L are not more than the threshold value X1. The controller 13 determines the product 30 as rejectable if the measured data L exceed the threshold value X1. As a result of the determination, if the product is acceptable, the controller 13 ends the inspection (step S7), and the operator transfers the product 30 to a next step. If the product is rejectable, the controller 13 makes an alarm equipment such as a buzzer or a display lamp (not shown) operate to inform an operator that the product 30 is rejectable. In a case that the alarm equipment operates, the operator takes out the product 30 put inside the inspection area 9, performs the fitting operation again, and then puts the product 30 into the inspection area 9 to perform the inspection again. Through these steps, it is possible to prevent occurrence of a defective product and to keep the quality of the product i.e. the work.

In FIG. 2, the image processing device 12 and the controller 13 composes a measurement unit to measure the above-described measured data L, and the controller 13 composes a determination unit to determine whether or not the first connector 2 and the second connector 3 are properly fitted. imaging by the camera 11, measuring of the opening length dimension L of the engagement detents 5 by the image processing device 12 and the controller 13, and determining of whether or not the first connector 2 and the second connector 3 are properly fitted by the controller 13 may be carried out automatically.

The measured data L are a length dimension which changes with deformation of the engagement detents 5. The deformation occurs with going-up of the engagement detents 5 onto the engagement portions 4. The measured data L are different greatly between in the state in which the engagement detents 5 go over the engagement portions 4 to become in a properly engaged state, and in the state in which the engagement detents 5 go up onto the engagement portions 4 and are kept in a deformed state. By utilizing deformation of the engagement detents 5, whether or not the first connector 2 and the second connector 3 are properly fitted can be determined reliably. Through the process, even in a case that an allowance dimension which is set in the fitting direction of the first connector 2 and the second connector 3 is small, it is possible to ensure the inspection accuracy of the fitted state of the connectors.

In addition, the measured data L are a length dimension ranging from one to the other of the opposing engagement detents 5, 5 of the second connector 3. By measuring the data L, even in a case in which at least one of the two engagement detents 5 is not engaged with the engagement portion 4, the determination can be performed properly.

In the above-described inspection method and an inspection device, in a case in which the first connector 2 and the second connector 3 have approximately the same shapes and different sizes, the fitting state can be easily determined by changing the threshold value X1 i.e. the piece of reference data.

A second embodiment will be described with reference to FIGS. 7 to 11. The second embodiment relates to an inspection method, an inspection device and a method of assembling an electric equipment having connectors.

Figure 7A:
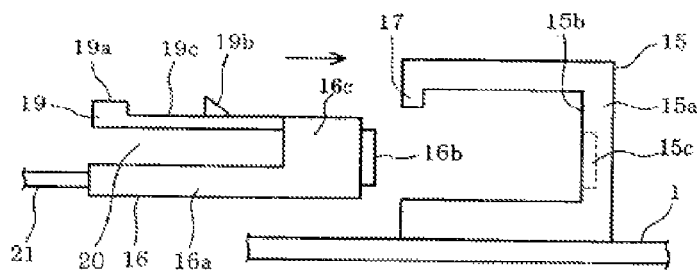
FIG. 7A to 7C show a steps of assembling an electric equipment having a first connector and a second connector according to a second embodiment, and are side views schematically showing steps of fitting the first connector and the second connector, respectively.
Figure 7B:
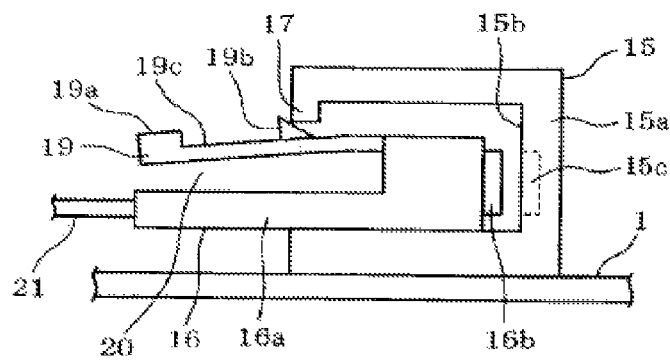
Figure 7C:
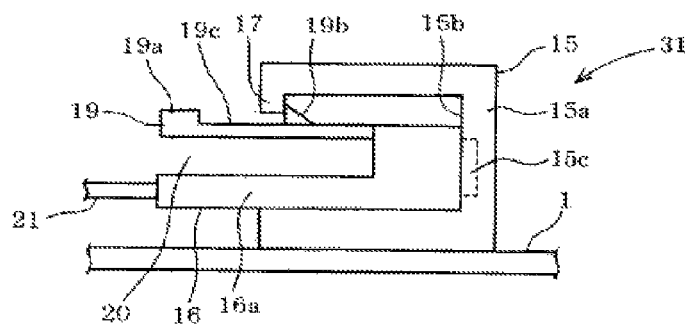

FIGS. 7A to 7C show steps of a method of assembling an electric equipment having connectors according to the second embodiment, and are side views schematically showing aspects where a second connector 16 is fitted into a first connector 15 mounted on a circuit board 1. FIG. 7A shows a state before fitting. FIG. 7B shows a state during fitting. FIG. 7C shows a state after fitting.

The first connector 15 is a female connector, and is mounted on an upper surface of the circuit board 1. The first connector 15 has a connector main body 15a of plastic composing the first connector 15. The connector main body 15a has a fitting concave portion 15b whose left side opens in FIG. 7A. The first connector 15 has an engage portion 17 which projects downward. The connector main body 15a has a plurality of conductive connection terminals 15c at a back portion of the fitting concave portion 15b. The connection terminals 15c are shown as one component as a whole in FIGS. 7A to 7C. The connection terminals 15c are female terminals and are arranged in parallel with each other in an up-and-down direction. The connection terminals 15c are connected electrically to terminals of the circuit board 1 via wirings (not shown).

Figure 10:
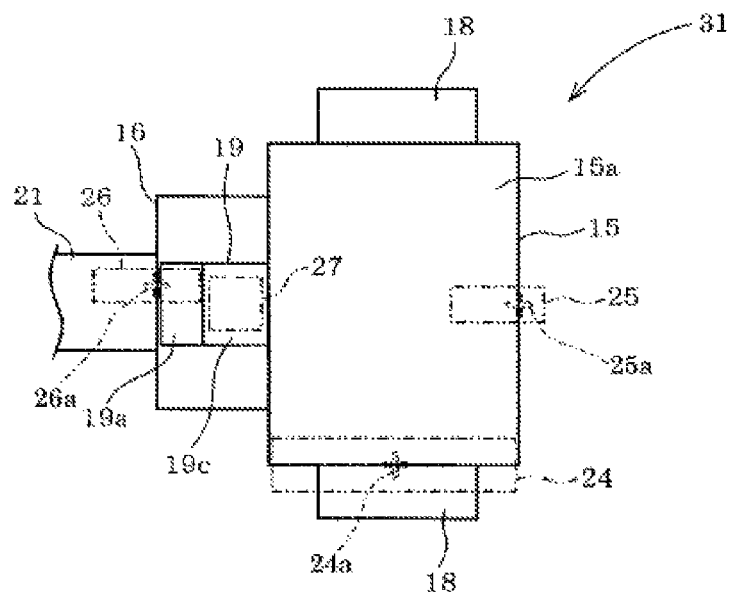
FIG. 10 is a view schematically showing a taken image of the state of FIG. 8.
Figure 11:
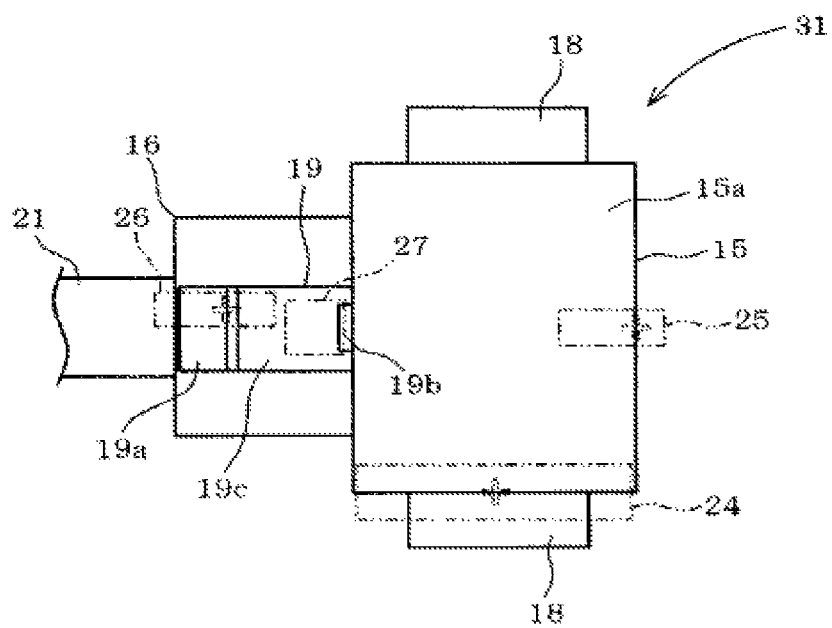
FIG. 11 is a view schematically showing a taken image of the state of FIG. 9.
Figure 12:
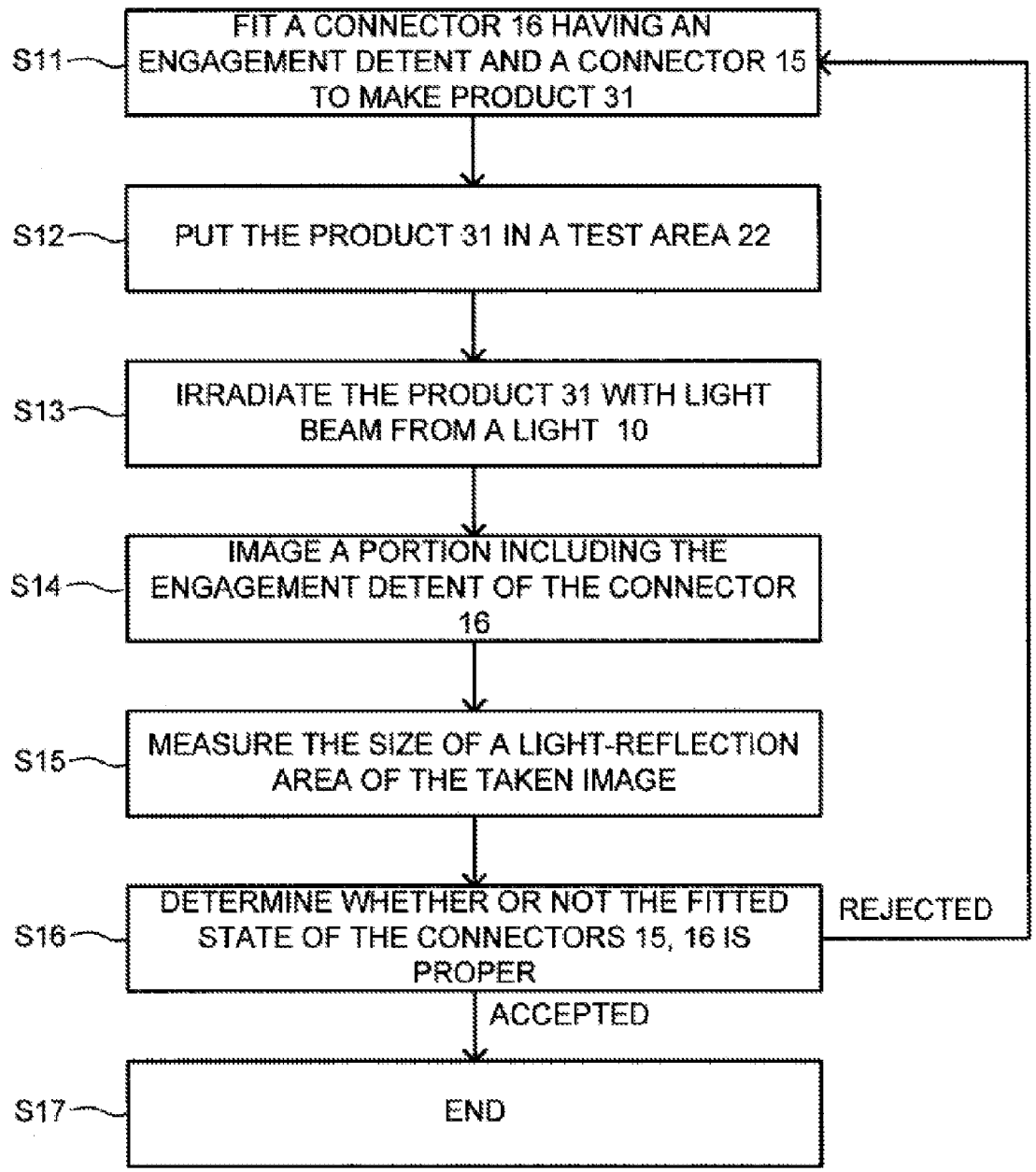
FIG. 12 is a flow chart to explain steps of an inspection method according to the second embodiment.

As shown in FIG. 10 and FIG. 11 which indicate picture images obtained by imaging fitting states, fixing portions 18 are provided at both side portions (end portions in an up-and-down direction in FIG. 10) of the first connector 15.

In FIGS. 7A to 7C, the second connector 16 is a male connector which forms a pair with the first connector 15. The second connector 16 has a connector main body 16a and an engagement detent 19 respectively of plastic. An end portion of the connector main body 16a supports the engagement detent 19. At a right side of the connector main body 16a, conductive connection terminals 16b are provided. The connection terminals 16b are shown as one component as a whole in FIGS. 7A to 7C. The connection terminals 16b project in a right direction and are arranged in parallel with each other in an up-and-down direction.

The engagement detent 19 has a rectangular plate shape as shown in FIG. 10 and FIG. 11. The engagement detent 19 is elastically deformable in an up-and-down direction by making a base end portion of the engagement detent 19 located on a right side serve as a fulcrum point as a fulcrum point. As shown in FIGS. 7A to 7C, the engagement detent 19 has a convex portion 19a at a leading end portion on a side of a free end portion, and has an engaging convex portion 19b projecting upward at an intermediate portion in an extending direction i.e. in a right and left direction of FIG. 7A. The engaging convex portion 19b has a triangular cross section. An upper surface portion 19c between the convex portion 19a and the engaging convex portion 19b in the engagement detent 19 is formed in a plane shape. Below the engagement detent 19, a space 20 is formed to allow the engagement detent 19 to be elastically deformed downwardly. A plurality of electric wires (a wire harness) 21 are connected to the connector main body 16a of the second connector 16. The electric wires 21 are electrically connected to the connection terminals 16b. The electric wires 21 are led out in a left direction in FIG. 7A.

Fitting of the first connector 15 and the second connector 16 is performed as described below. As shown in FIG. 7A, in a state in which the engagement detent 19 of the second connector 16 is directed toward a side of the first connector 15, the second connector 16 is moved toward a side of the first connector 15 i.e. in a direction of an arrow. The leading end portion of the second connector 16 is inserted into the fitting concave portion 15b of the first connector 15. As a result, as shown in FIG. 7B, the engaging convex portion 19b of the engagement detent 19 of the second connector 16 goes up onto the engagement portion 17 of the first connector 15 from a downward direction, and the engagement detent 19 is elastically deformed downwardly. Then, as shown in FIG. 7C, the engaging convex portion 19b goes over the engagement portion 17 and becomes in a state in which the engaging convex portion 19b is engaged with the engagement portion 17 in a retaining state. In this manner, the second connector 16 is fitted into the fitting concave portion 15b of the first connector 15, and the connection terminals 16b of the second connector 16 are fitted into the connection terminals of the first connector 15. The first connector 15 and the second connector 16 become in a properly fitted state. At this time, a large part of the upper surface portion 19c between the convex portion 19a and the engaging convex portion 19b on the engagement detent 19 is exposed toward the outside of the connector main body 15a of the first connector 15. The fitting operation of the first connector 15 and the second connector 16 may be performed by an operator.

An inspection method and an inspection device for determining whether or not the first connector 15 and the second connector 16 are properly fitted will be described. The inspection is performed utilizing a change of a reflected light of an illumination for use in imaging. The change of the reflected light corresponds to a state of the engagement detent 19 of the second connector 16 which changes depending on a fitting state.

Figure 8:
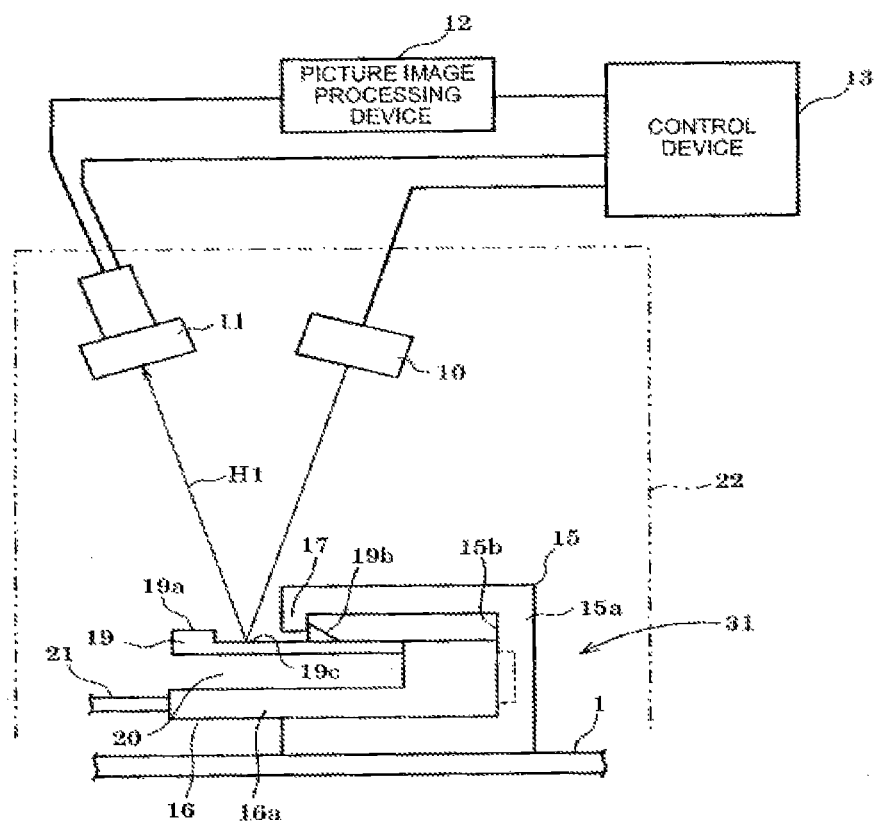
FIG. 8 is a side view schematically showing an aspect where a fitting state of the first connector and the second connector is inspected, and showing a state in which the first connector and the second connector are properly fitted.

FIG. 8 is a side view schematically showing an aspect where a fitting state of the first connector 15 and the second connector 16 is inspected. In an inspection area 22, the light 10 composing an illumination unit and the camera 11 for imaging the fitting state of the connectors are installed. The light 10 and the camera 11 are set at a position and with an angle which are suitable for imaging the fitting state of the connectors as described below.

FIG. 8 shows a state in which the first connector 15 and the second connector 16 are properly fitted. This properly fitted state is a state in which the engaging convex portions 19b of the engagement detent 19 of the second connector 16 goes over the engagement portion 17 of the first connector 15 and is properly engaged with the engagement portion 17. The engagement detent 19 goes over the corresponding engagement portion 17 so as to return to a horizontal state before fitting from a deformed state. In FIG. 8, the engagement detent 19 is in a state parallel to an upper surface of the circuit board 1.

As shown in FIG. 8, the light 10 and the camera 11 are installed so that the first and second connectors 15, 16 fitted properly are irradiated with light beam from the light 10, a part of the light is reflected particularly on the upper surface portion 19c of the engagement detent 19, and the reflected light H1 is directed toward the camera 11. FIG. 10 is a schematic view of an image obtained by processing a picture image in the image processing device 12. Before the processing, the picture image is taken by the camera 11 in the state shown in FIG. 8. In FIG. 10, a portion where light is reflected on the upper surface portion 19c of the engagement detent 19 is observed in a state shining whitely. In order to measure the size of a light-reflection region which is observed in a state shining whitely, pattern matching between pattern data of the picture image taken by the camera 11 and pattern data of a connector shape of a product 31 registered in the image processing device 12 previously is performed.

The position and the angle of the camera 11 are adjusted until the pattern data of the picture image matches with the registered pattern data. Through the pattern matching, a place to be measured in the product 31 is determined. In FIG. 10, a first matching area 24 and a second matching area 25 are areas for positioning the first connector 15. Specifically, the first matching area 24 is an area for checking the vicinity of one of the fixing portions 18 at one side portion of the first connector 15. The second matching area 25 is an area for checking the position of a right end portion of the first connector 15. In FIG. 10, a third matching area 26 is an area for checking the position of the second connector 16. In the first to third matching areas 24, 25 and 26, cross-shaped mark patterns are provided for the pattern matching. A measurement area 27 is an area for measuring the size of the light-reflection region of the light which is reflected on the upper surface portion 19c of the engagement detent 19. The area size is measured from the number of dots shining whitely, for example. The area size obtained by the measurement is assumed as A1.

Figure 9:
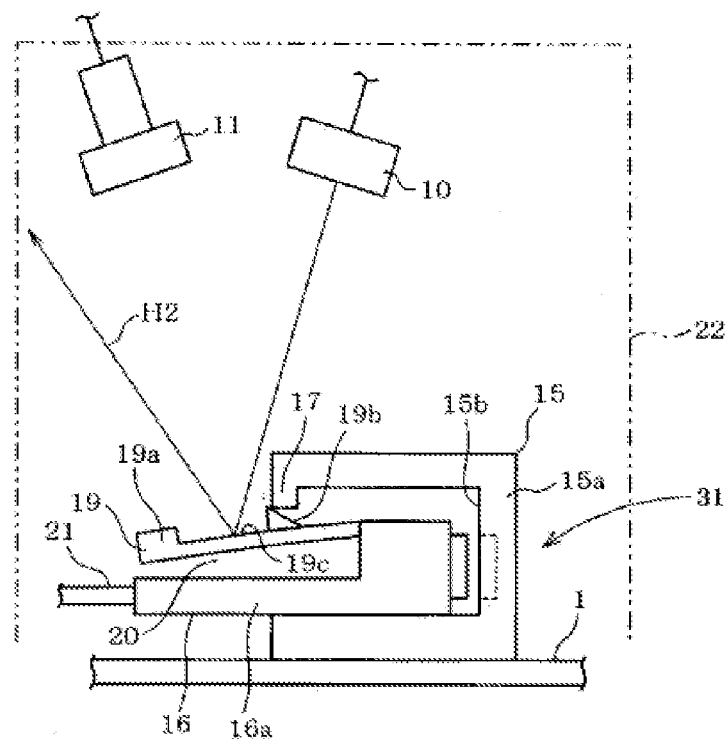
FIG. 9 is a side view schematically showing an aspect where a fitting state of the first connector and the second connector, and showing a state in which the first connector and the second connector are not properly fitted.

FIG. 9 shows a state in which the first connector 15 and the second connector 16 are not properly fitted. To reach the state, the engaging convex portion 19b of the engagement detent 19 of the second connector 16 goes up onto the engagement portion 17 of the first connector 15 from downward direction, and the engagement detent 19 becomes in a state of being deformed downwardly. In a case that the connectors kept in the fitted state are put into the above-described inspection area 22, the first and second connectors 15, 16 are irradiated with light from the light 10, and a light H2 out of the light which is reflected on the upper surface portion 19c of the engagement detent 19 is directed toward a location deviated from the camera 11. FIG. 11 is a schematic view of an image obtained by processing a picture image in the image processing device 12a in the state of FIG. 9. Before the processing, the latter picture image is taken by the camera 11. In a measurement area 27 of FIG. 11, an area where a light reflected on the upper surface portion 19c of the engagement detent 19 is observed in a state shining whitely is hardly present, or even if such an area is present, the area size becomes considerably smaller than that of the case of FIG. 10. The area size obtained this time is assumed as A2. The relation of the area sizes A1, A2 obtained from the picture images of FIG. 10, 11 becomes the relation of the following expression.

$$A1 > A2 \quad (6)$$

Then, a threshold value X2 i.e. a piece of reference data is set in order to determine the aforementioned first connector 15 and second connector 16 in a properly fitted state as acceptable, and to determine those in an improperly fitted state as rejectable. The threshold value X2 is set to satisfy the following expression. In the controller 13, the threshold value X2 is stored as a piece of reference data.

$$A1 \geq X2 > A2 \quad (7)$$

Steps from a fitting operation of the first and second connectors to an end of an inspection will be described with reference to a flow chart shown in FIG. 12, FIGS. 7A to 7B and FIGS. 8 to 11. Following the flow chart of FIG. 12, an operator performs fitting operation of the first connector 15 mounted on the circuit board 1, and the second connector 16 (step S11). The operator puts a product 31 i.e. a work in which the first connector 15 and the second connector 16 are fitted into an inspection area 22 (step S12). Then, the controller 13 makes the light 10 light up to illuminate the first connector 15 and the second connector 16 in a fitted state from an upward direction (step S13). Further, the controller 13 controls the camera 11 to image the first connector 15 and the second connector 16 in a fitted state from the upward direction (step S14).

The controller 13 instructs the image processing device 12 to process a picture image which is taken by the camera 11. The controller 13 measures an area size "A" of a light-reflection region in a measurement area 27 as shown in FIG. 10 or 11 (step S15). The controller 13 further compares the measured area size "A" obtained by the measurement and the threshold value X2 i.e. the piece of reference data, and determines whether or not the fitted state is proper (step S16). Specifically, the controller 13 determines the product 31 as acceptable if the measured area size "A" is not less than the threshold value X2, and determines the product 31 as rejectable if the measured area size "A" is less than the threshold value X2. As a result of the determination, if acceptable, the controller 13 ends the inspection (step S17), and makes the work to move to the next process. If the product is rejectable, the controller 13 makes an alarm equipment such as a buzzer or a display lamp (not shown) operate to inform the operator that the product is rejectable. In the case that the alarm equipment operates, the operator takes out the work put inside the inspection area 22, and performs a fitting operation again, and then puts the work into the inspection area 22 to perform an inspection again. In such a way, it is possible to prevent production of a defective product and to keep the quality of the product i.e. the work.

In the embodiment, the image processing device 12 and the controller 13 composes a measuring unit to measure the above-described measured piece of data "A", and the controller 13 composes a determining unit to determine whether or not the first connector 15 and the second connector 16 are properly fitted. Imaging by the camera 11, measuring of the measurement area 27 by the image processing device 12, and determining of whether or not the first connector 2 and the second connector 3 are properly fitted by the controller 13 may be carried out automatically.

As shown in FIG. 7B, the measured piece of data i.e. the area size "A" is a piece of data which changes with deformation of the engagement detent 19. The deformation occurs with going-up of the engagement detent 19 onto the engagement portion. The measured piece of data i.e. the area size "A" is different greatly between in a state in which the engagement detent 19 goes over the engagement portion 17 and is properly engaged, and in a state in which the engagement detent 19 goes up onto the engagement portion 17 and is deformed. By utilizing the deformation of the engagement detent 19 and the light-reflection amount of the light, whether or not the first connector 15 and the second connector 16 are properly fitted can be reliably determined. In addition, even in a case that an allowance dimension which is set in a fitting direction of the first connector 15 and the second connector 16 is small, it is possible to ensure the inspection accuracy of the fitting state of the connectors.

In the above-described embodiments, examples in which the first connector is mounted on the circuit board are shown. The above-described technique can be applied to a case in which a connector is mounted on a member other than a circuit board. The technique can be applied to a case in which a first connector and a second connector are simply fitted without being mounted on the circuit board 1 or the like. The above-described technique can be applied to connectors for connecting optical interconnections as well as connectors for connecting electric wirings.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of assembling an electric equipment having a first electric connector and a second electric connector, comprising:
    assembling the electronic equipment having the first electric connector and the second electric connector by:
    fitting the first electric connector having an engagement portion and the second electric connector having an elastically deformable engagement detent for engaging with the engagement portion, the engagement detent being capable of going over the engagement portion and of being engaged with the engagement portion;
    after fitting, imaging a portion of the second electric connector including the engagement detent by a camera;
    after imaging, measuring data of changes with a deformation of the engagement detent from a picture image obtained by the imaging, the deformation occurring with a rising of the engagement detent onto the engagement portion;
    after measuring, determining whether or not the engagement portion of the first electric connector and the engagement detent of second electric connector are properly engaged by comparing the measured data and predetermined reference data; and
    after determining, refitting the first electric connector and the second electric connector when it is determined that the first electric connector and the second electric connector are not properly fitted as a result of the determination.

2. The method according to claim 1, wherein the first electric connector has a first body and another engagement portions to be engaged with the second electric connector, the engagement portions being provided in the first electric connector and opposing each other, the second electric connector has a second body and another engagement detent, the engagement detents being provided in the second body and opposing each other, and the measured data is a length dimension from one to the other of the opposing engagement detents.

3. The method according to claim 2, wherein the engagement detents are supported by a portion of the second body, and the measured data corresponds to a size of a reflection region of a light which is reflected on an upper surface of a portion of the engagement detent exposed outside from the first connector.

4. The method according to claim 3, wherein, after imaging the portion of the second electric connector including the engagement detent, pattern matching between a piece of pattern data of a shape of the first connector or the second connector, and a piece of data of the picture image obtained by imaging using the camera is performed, and a position for performing the measurement is determined.

5. The method according to claim 4, wherein the first connector or the second connector connects electric wirings or optical interconnections.

* * * * *